United States Patent [19]

Kato et al.

[11] Patent Number: 5,439,243
[45] Date of Patent: Aug. 8, 1995

[54] VEHICLE SUSPENSION

[75] Inventors: Yoichiro Kato; Masaki Tanaka; Chikara Ito, all of Zama, Japan

[73] Assignee: Nissan Motor Co., Ltd., Yokohama, Japan

[21] Appl. No.: 212,780

[22] Filed: Mar. 15, 1994

[30] Foreign Application Priority Data

| Mar. 15, 1993 | [JP] | Japan | 5-053880 |
| Mar. 15, 1993 | [JP] | Japan | 5-053881 |
| Mar. 15, 1993 | [JP] | Japan | 5-053882 |
| Mar. 15, 1993 | [JP] | Japan | 5-053883 |

[51] Int. Cl.⁶ .................................. B60G 21/00
[52] U.S. Cl. ................... 280/689; 280/688; 280/723
[58] Field of Search ............... 280/688, 689, 723, 724, 280/726, 717, 715, 673

[56] References Cited

U.S. PATENT DOCUMENTS

| 2,777,686 | 1/1957 | Giacosa et al. | 267/16 |
| 4,153,272 | 5/1979 | Fiedler et al. | 280/689 |
| 4,589,677 | 5/1986 | Matachinsky | 280/726 |
| 4,703,947 | 11/1987 | Tattermusch et al. | 280/689 |
| 4,765,650 | 8/1988 | Kameshima et al. | 280/723 |
| 5,310,212 | 5/1994 | Uno et al. | 280/689 |

FOREIGN PATENT DOCUMENTS

| 0220851 | 5/1987 | European Pat. Off. |
| 1479822 | 3/1967 | France . |
| 2316004 | 10/1974 | Germany . |
| 2742426 | 3/1979 | Germany . |
| 3136016 | 3/1983 | Germany . |
| 4210132 | 10/1992 | Germany . |
| 58-139807 | 8/1983 | Japan . |
| 61-77507 | 4/1986 | Japan . |
| 61-87703 | 6/1986 | Japan . |
| 63-70412 | 5/1988 | Japan . |
| 64-28013 | 1/1989 | Japan . |
| 64-28014 | 1/1989 | Japan . |
| 2-254006 | 10/1990 | Japan . |
| 2-262409 | 10/1990 | Japan . |
| 197905 | 9/1923 | United Kingdom . |

Primary Examiner—Brian L. Johnson
Assistant Examiner—Paul N. Dickson
Attorney, Agent, or Firm—Foley & Lardner

[57] ABSTRACT

An automotive vehicle including a vehicle body and a torsion beam which supports the vehicle body thereon and left and right axles at opposite ends thereof. A lateral link extends in a transverse direction of the vehicle body and has one end portion pivotally connected to the torsion beam and the other end portion connected to the torsion beam. A control link is pivotally connected at one end portion thereof to the lateral link and at the other end portion thereof to the torsion beam. Centers of the respective pivotal connections of the lateral link to the vehicle body and the torsion beam and centers of the respective pivotal connections of the control link to the lateral link and the torsion beam, are disposed in the common vertical plane with respect to the vehicle body.

17 Claims, 12 Drawing Sheets

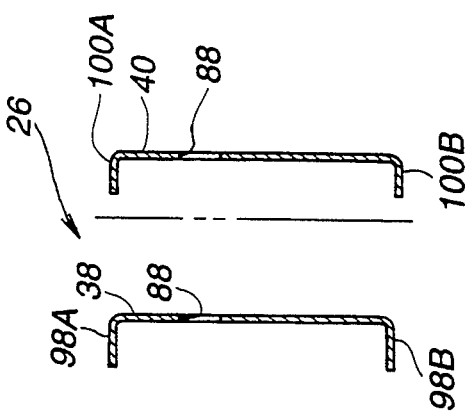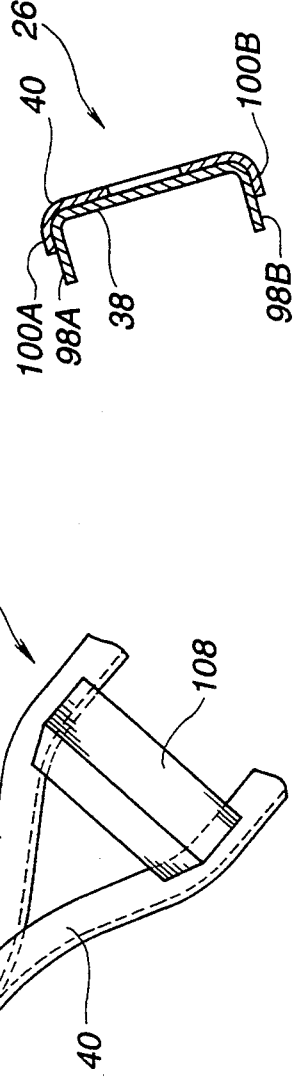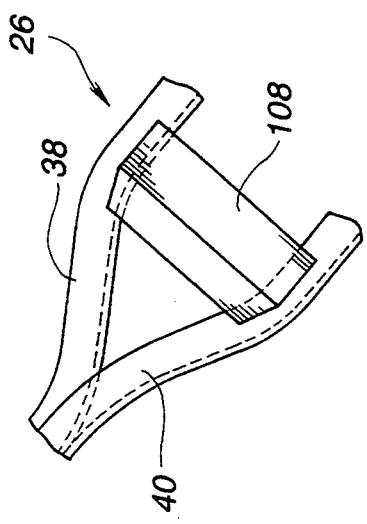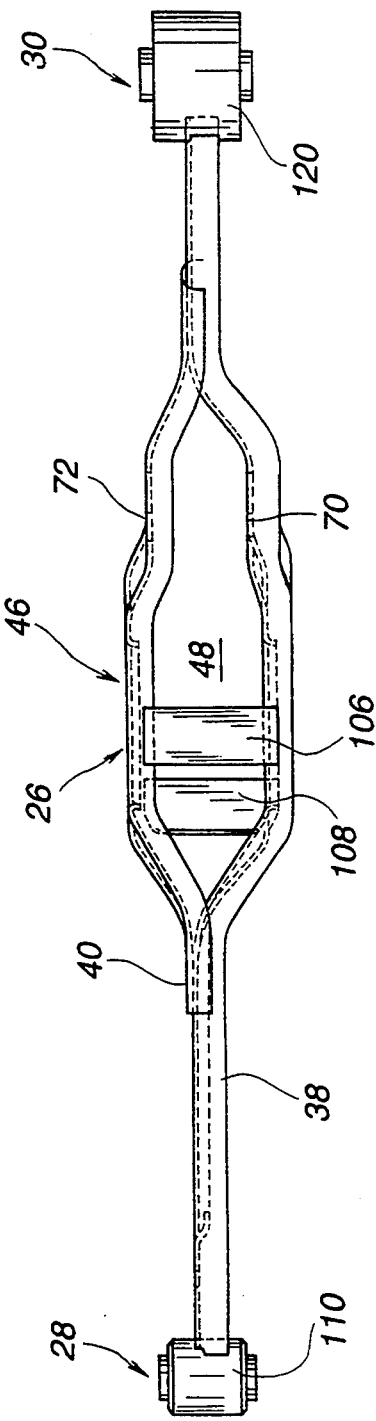

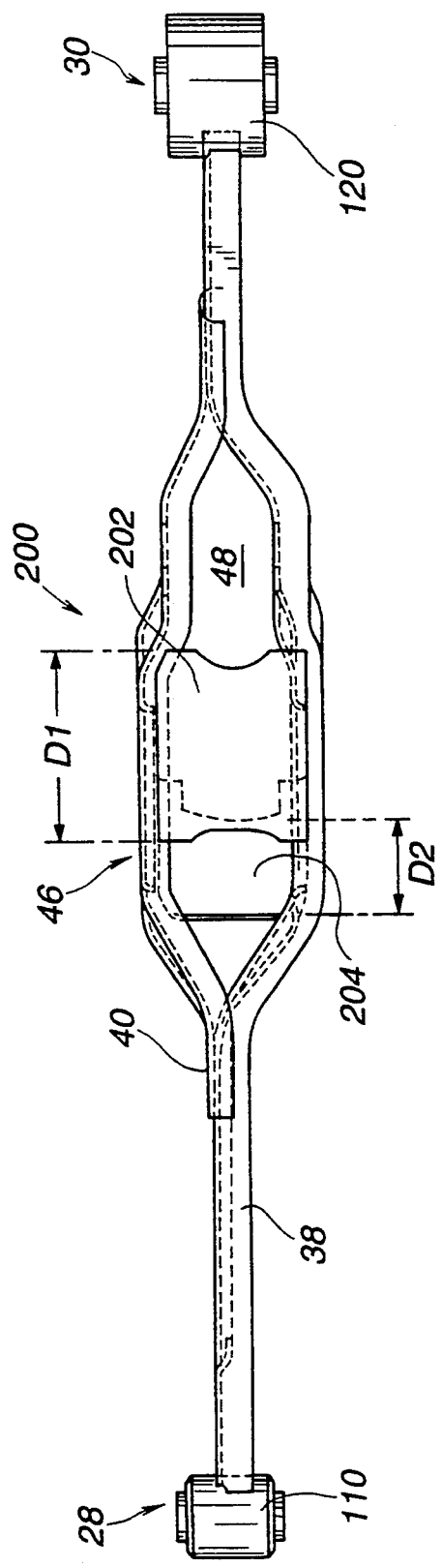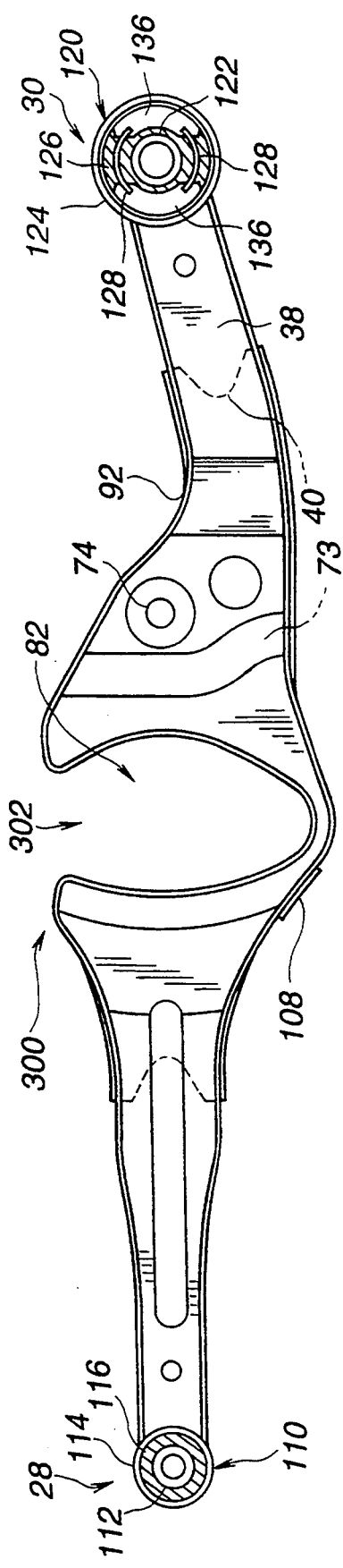

VEHICLE SUSPENSION

RELATED COPENDING APPLICATION

U.S. patent application Ser. No. 07/858,714 filed by Takaaki UNO et al. on Mar. 27, 1992 which has been commonly assigned and now formally allowed on Nov. 24, 1993.

U.S. patent application Ser. No. 08/103,537 filed by Kazuki SHIDA et al. on Aug. 9, 1993 which has been commonly assigned and now pending.

BACKGROUND OF THE INVENTION

The present invention relates to a torsion beam type suspension for automotive vehicles.

U.S. Pat. No. 4,765,650 discloses a torsion beam type suspension including a lateral link connected to a vehicle body through a bushing assembly.

Japanese Patent Application First Publication No. 2-254006 discloses a torsion beam type suspension including two links associated with a lateral link for controlling a lateral displacement of pivotal connection of the lateral link to a torsion beam.

SUMMARY OF THE INVENTION

An object of the present invention is to provide a suspension which can reduce a bending moment or stress applied to a lateral link.

Another object of the present invention is to provide a suspension in which the lateral link has an enhanced rigidity.

According to the present invention, there is provided in an automotive vehicle, a vehicle body;

a torsion beam supporting left and right axles at opposite ends thereof and supporting the vehicle body thereon;

a lateral link extending in a transverse direction of the vehicle body and pivotally connected at one end portion thereof to the vehicle body about a first axis and at the other end portion thereof to the torsion beam about a second axis parallel to the first axis; and a control link pivotally connected at one end portion thereof to the lateral link about a third axis and at the other end portion thereof to the torsion beam about a fourth axis parallel to the third axis;

wherein centers of the respective pivotal connections of the lateral link to the vehicle body and the torsion beam and centers of the respective pivotal connections of the control link to the lateral link and the torsion beam, are disposed in the common vertical plane with respect to the vehicle body.

BRIEF DESCRIPTION OF THE DRAWINGS

FIG. 9 is a sectional view taken along the line IX—IX of FIG. 6;

FIG. 10 is a sectional view taken along the line X—X of FIG. 6;

FIG. 11 is a top plane view of the lateral link;

FIG. 12 is a fragmental view as viewed from a direction as indicated by an arrow XI of FIG. 6;

FIG. 17 is a top plane view of the modified lateral link of FIG. 16;

FIG. 18 is an elevation of another modified lateral link; and

DESCRIPTION OF THE PREFERRED EMBODIMENT

Figure 1:
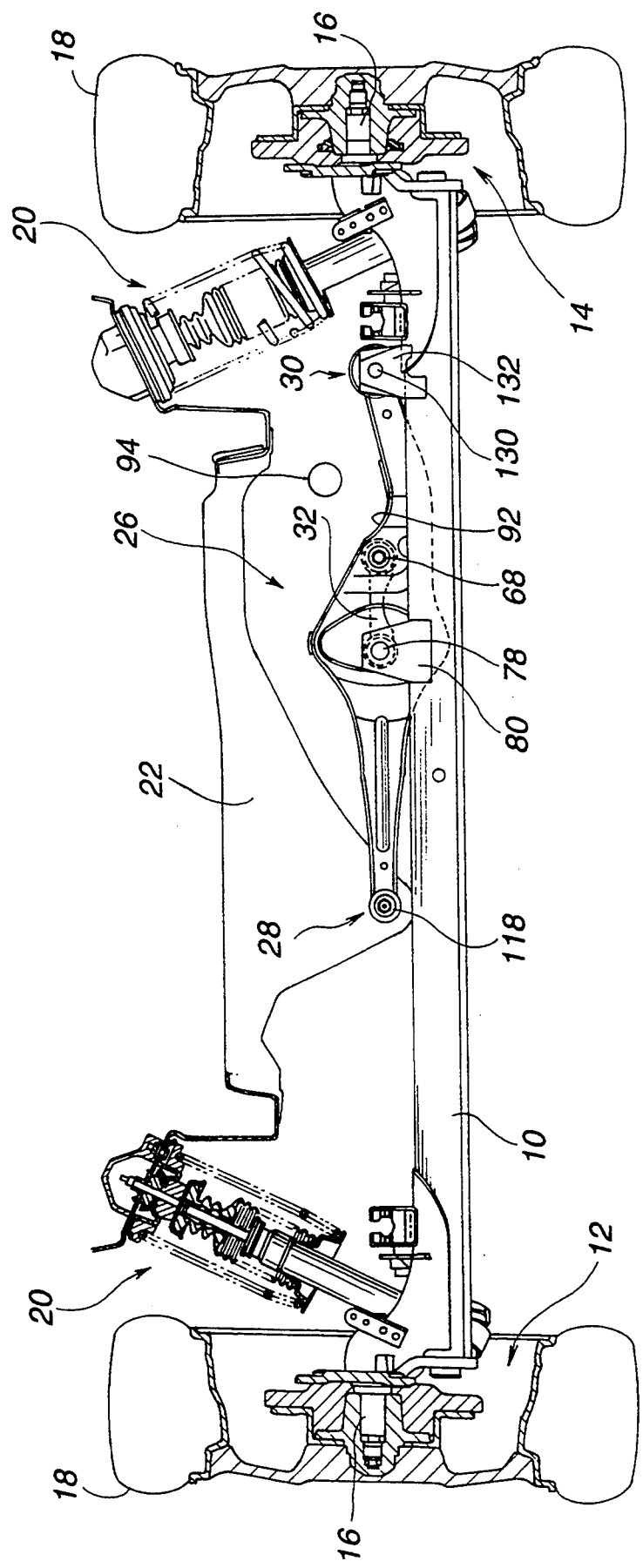
FIG. 1 is an elevation, partially in cross-section, of a rear suspension of a vehicle, according to the present invention.
Figure 2:
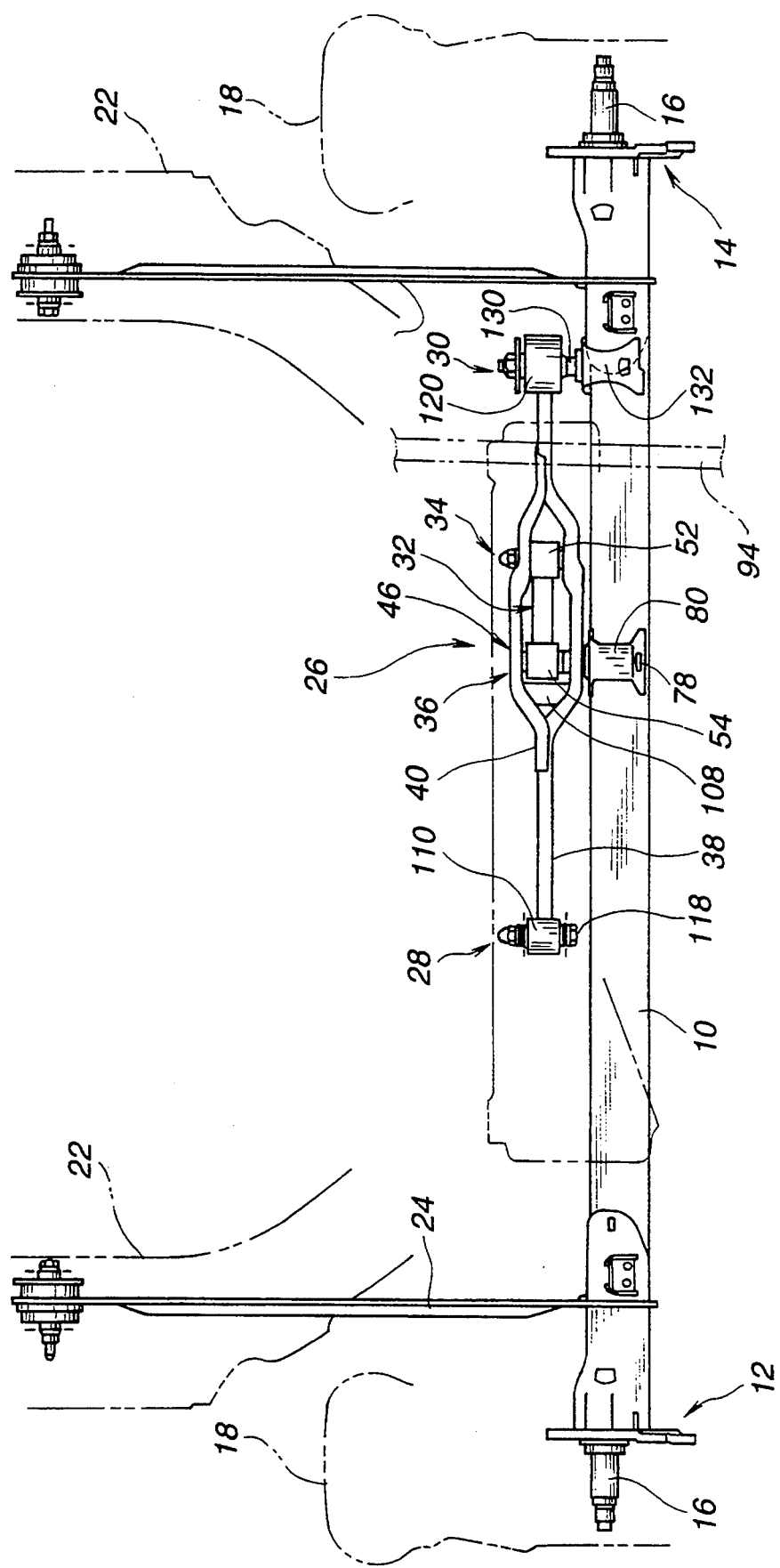
FIG. 2 is a top plane view of the rear suspension of FIG. 1.

Referring now to FIGS. 1 and 2, there is shown a rear suspension of a torsion beam type adapted for a vehicle, to which a suspension arrangement of the present invention is applied.

As shown in FIGS. 1 and 2, the rear suspension includes a torsion beam 10 extending in a transverse direction of the vehicle and having opposite end portions 12 and 14 supporting left and right axles 16, respectively. The left and right axles 16 rotatably support a pair of wheels 18 thereon, respectively. The torsion beam 10 supports a body 22 of the vehicle thereon through a pair of shock absorbers 20 as shown in FIG. 1. Each of the shock absorbers 20 has one end thereof connected with near the opposite end portions 12 and 14 of the torsion beam 10 and the other end thereof connected with the body 22 of the vehicle.

As seen in FIG. 2, a pair of trailing arms 24 extending forward in a longitudinal direction of the vehicle are connected with the torsion beam 10, respectively. Each of the trailing arms 24 has one end fixed to inward the opposite ends 12 and 14 of the torsion beam 10 and the other end pivotally connected with the vehicle body 22.

Figure 3:
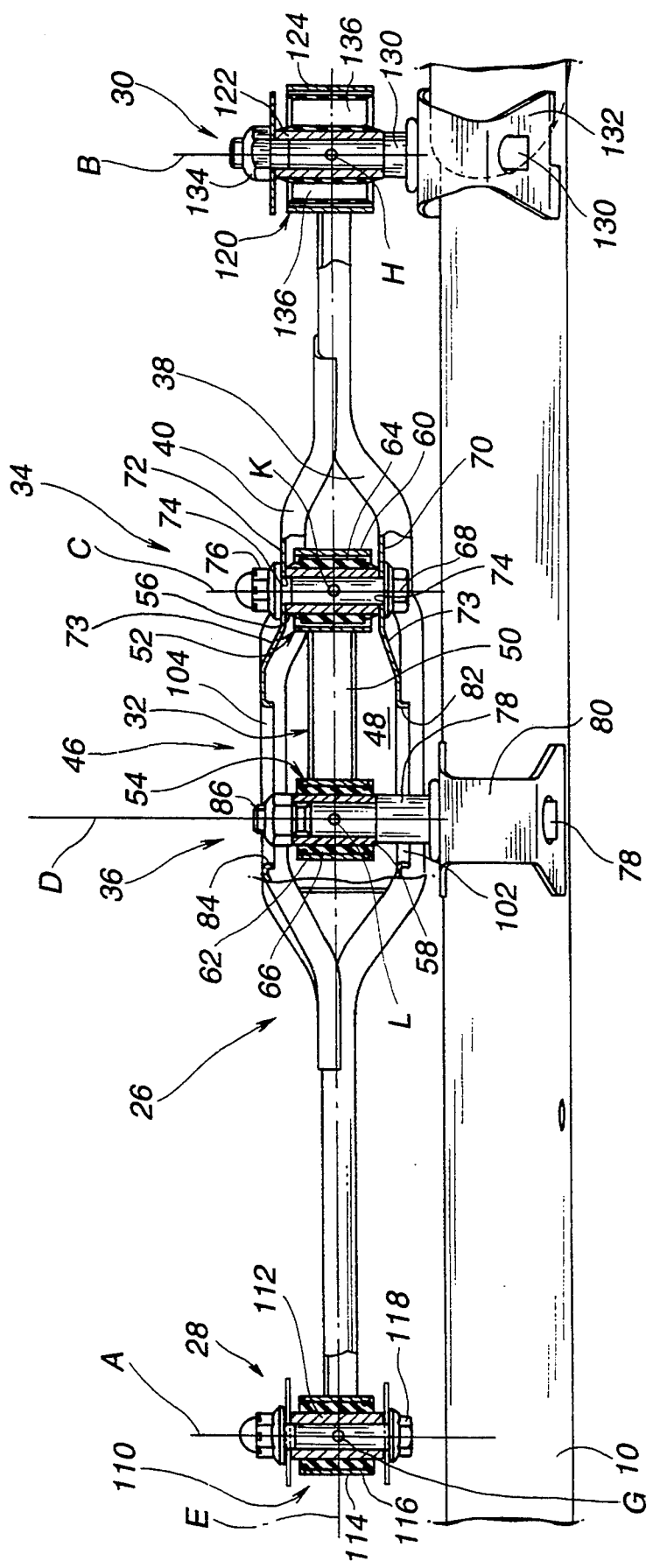
FIG. 3 is an enlarged view of an essential part of the suspension, showing a lateral link and a control link which are connected to a torsion beam.

As shown in FIGS. 2 and 3, a lateral link 26 extending in the transverse direction of the vehicle is pivotally connected to the vehicle body 22 at one end portion 28 thereof about a first axis A and to the torsion beam 10 at the other end portion 30 thereof about a second axis B parallel to the first axis A.

As seen in FIGS. 2 and 3, a control link 32 is pivotally connected to the lateral link 26 at one end portion 34 thereof about a third axis C, and to the torsion beam 10 at the other end portion 36 thereof about a fourth axis D parallel to the third axis C.

As best shown in FIG. 3, centers G and H of the pivotal connections of the lateral link 26 to the vehicle body 22 and the torsion beam 10 and centers K and L of the pivotal connections of the control link 32 to the lateral link 26 and the torsion beam 10, are disposed in the common vertical plane with respect to the vehicle body. Thus, a distance between the lateral link 26 and the control link 32 in the longitudinal direction of the vehicle is eliminated. The elimination of the distance serves for restricting a bending moment or stress caused on the lateral link 26 due to a lateral force which is applied via the wheels 18 and the control link 32 to the lateral link 26 in the transverse direction of the vehicle.

As best shown in FIG. 3, the lateral link 26 comprises a set of plates which include a main plate 38 extending in the transverse direction of the vehicle and a subsidiary plate 40 connected at opposed ends thereof with the main plate 38. The main plate 38 of the lateral link 26 has in a middle section thereof a bent portion 42 swelled toward the torsion beam 10 as seen in FIG. 3. Similarly, as best shown in FIG. 3, the subsidiary plate 40 is formed with a bent portion 44 in substantially symmetrical relation to the bent portion 42 of the main plate 38 with respect to a line E drawn between centers of the opposed end portions 28 and 30 of the lateral link 26. Thus, the bent portions 42 and 44 of the main and subsidiary plates 38 and 40 cooperate to form a shell section 46 defining a space 48 in which the control link 32 is disposed.

Figure 4:
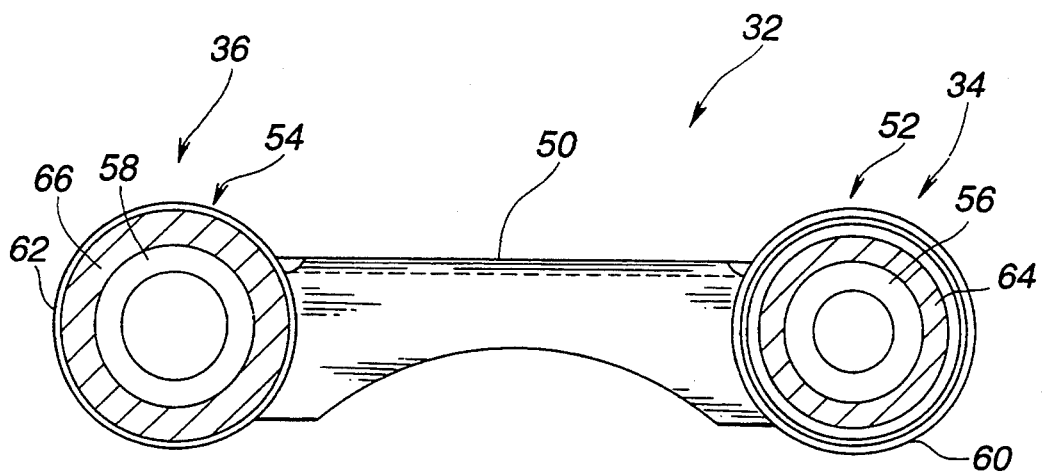
FIG. 4 is an elevation of the control link.
Figure 5:
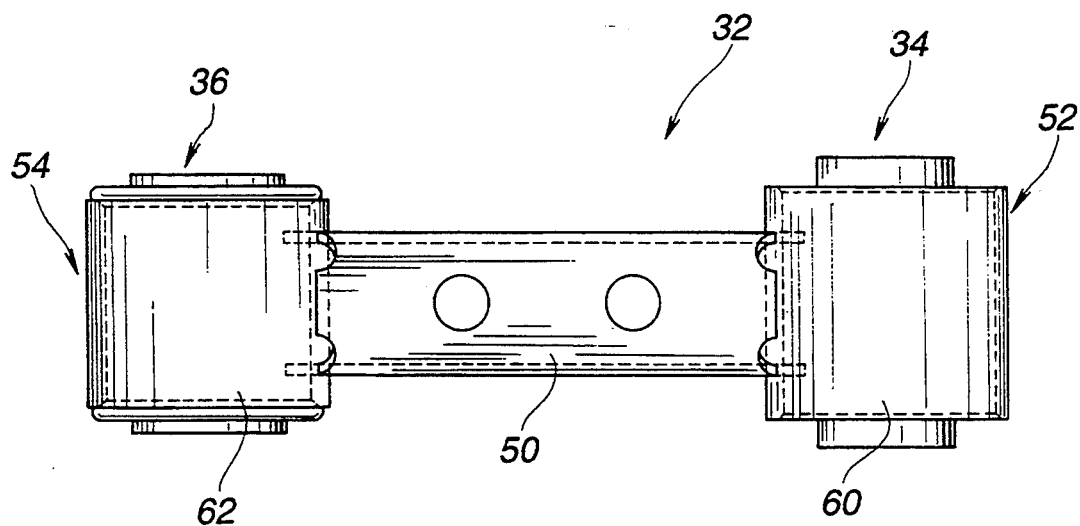
FIG. 5 is a top plane view of the control link of FIG. 4.

As shown in FIGS. 3–5, the control link 32 includes a base plate 50 of a generally reversed U shape in cross section, and a pair of bushing assemblies 52 and 54 disposed at opposed ends of the base plate 50. As seen in FIGS. 4 and 5, the bushing assemblies 52 and 54 respectively include inner tubular members 56 and 58, outer tubular members 60 and 62, and elastic bushings 64 and 66 interposed therebetween.

Referring back to FIG. 3, the end portion 34 of the control link 32 is pivotally connected to the lateral link 26 by a pin 68 which is supported on and between shoulders 70 and 72 of the main and subsidiary plates 38 and 40. The shoulders 70 and 72 are disposed adjacent tapered portions 73 in the shell section 46 such that the space 48 between the shoulders 70 and 72 is reduced in the longitudinal direction of the vehicle. The pin 68 extends through the inner tubular member 56 of the bushing assembly 52 and a pair of openings 74 formed at the shoulders 70 and 72. As seen in FIG. 3, the pin 68 is secured to the lateral link 26 by fastening a nut 76 to an end thereof. Thus, the end 34 of the control link 32 is pivotally supported by the pin 68 secured on the shoulders 70 and 72. This two-point support arrangement of the control link 32 on the lateral link 26 allows share of a force applied to the lateral link 26, between the shoulders 70 and 72. Accordingly, the two-point support arrangement has an increased rigidity against the force.

As shown in FIG. 3, the other end 36 of the control link 32 is pivotally connected to the torsion beam 10 by means of a pin 78. The pin 78 is supported at one end thereof by a bracket 80 which is secured to the torsion beam 10. The pin 78 extends through the inner tubular member 58 of the bushing assembly 54 and a pair of openings 82 and 84 which are disposed at the shell section 46 of the lateral link 26 in opposed relation. The pin 78 is secured to the torsion beam 10 by fastening a nut 86 to the other end thereof. The end 36 of the control link 32 may be pivotally connected to the vehicle body.

Figure 6:
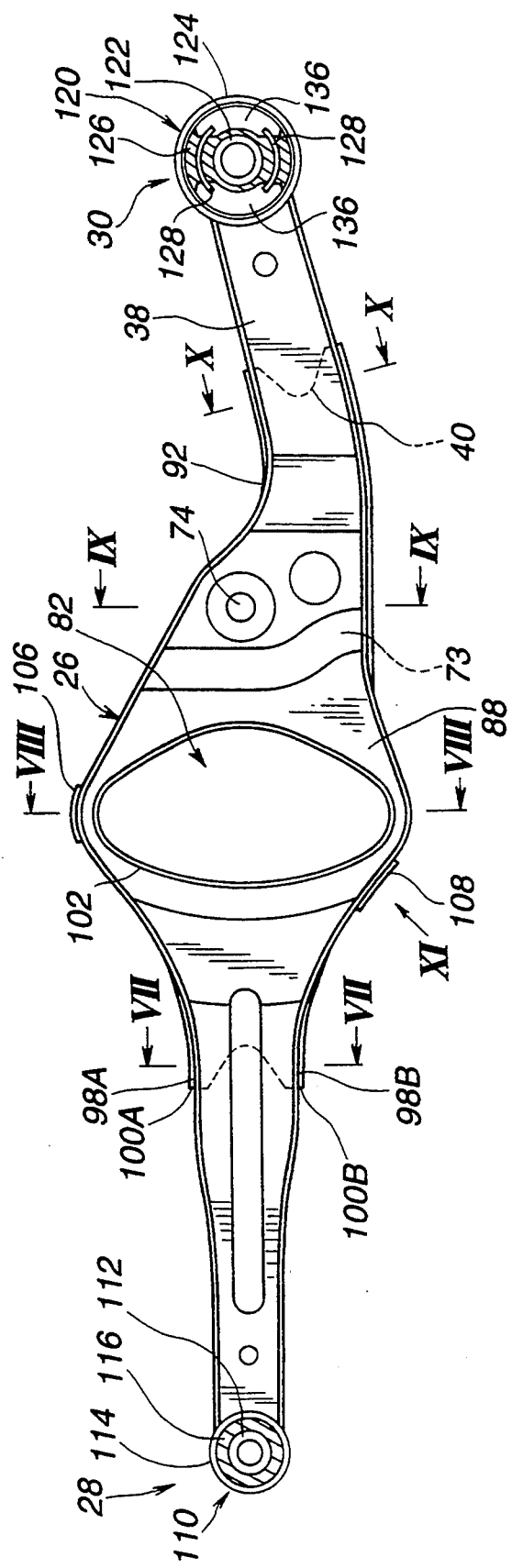
FIG. 6 is an elevation of the lateral link.

As best shown in FIG. 6, the openings 82 and 84 of the shell section 46 of the lateral link 26 are of generally oval shape and disposed on swelled areas 88 which extend in the substantially vertical direction with respect to the vehicle body. The oval openings 82 and 84 are so arranged as to have a size sufficient for preventing interference between the lateral link 26 and the pin 78 upon the relative pivotal motion of the lateral link 26 and the control link 32. In addition, the oval openings 82 and 84 serve for removing therethrough foreign substances entered into the shell section 46. The oval opening 84 disposed on the subsidiary plate 40 may be omitted.

As seen in FIG. 6, recesses 92 are so arranged on the main and subsidiary plates 38 and 40 as to prevent interference between the lateral link 26 and components 94 such as an exhaust pipe which are disposed below a vehicle floor 96 in the vicinity of the lateral link 26.

Figure 7:
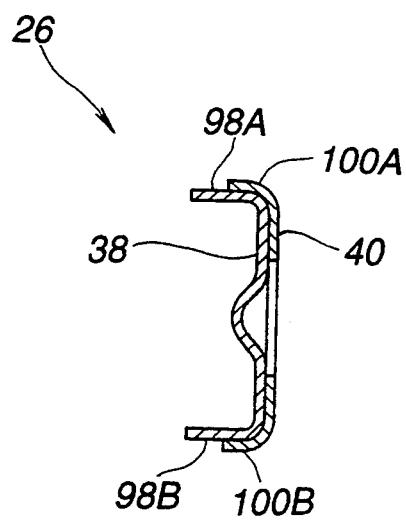
FIG. 7 is a sectional view taken along the line VII—VII of FIG. 6.
Figure 8:
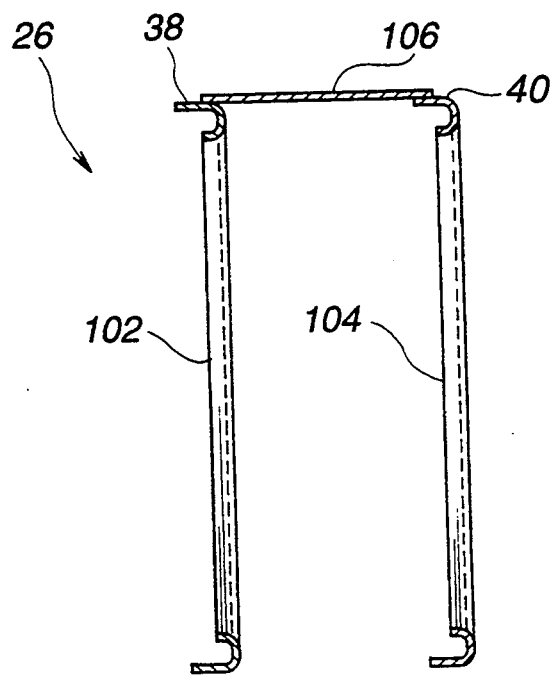
FIG. 8 is a sectional view taken along the line VIII—VIII of FIG. 6.

The main and subsidiary plates 38 and 40 are respectively formed with integral flanges 98A and 98B, and 100A and 100B extending in the longitudinal direction of the vehicle from upper and lower edges thereof as viewed in FIGS. 6–10. The provision of the integral flanges 98A, 98B and 100A, 100B serve for increasing rigidity of the lateral link 26 by welding in an overlapping relation to each other as seen in FIGS. 7 and 10. As shown in FIGS. 3, 6 and 8, integral flanges 102 and 104 extend in the longitudinal direction of the vehicle from peripheral edges of the oval openings 82 and 84 of the main and subsidiary plates 38 and 40, respectively. The provision of the integral flanges 102 and 104 enhances rigidity in the peripheries of the oval openings 82 and 84 of the swelled areas 88.

As shown in FIGS. 6, 8, 11 and 12, a pair of reinforcing plates 106 and 108 extending in the longitudinal direction of the vehicle and connect opposed upper ends and opposed lower ends of the swelled areas 88 of the main and subsidiary plates 38 and 40, respectively. The provision of the reinforcing plates 106 and 108 serves for increasing rigidity of the shell section 46 of the lateral link 26. The reinforcing plates 106 and 108 may be omitted in a case where the lateral link 26 is integrally formed of a generally reverse U shape in cross section.

Referring back to FIG. 6, a bushing assembly 110 is disposed at the end portion 28 of the lateral link 26 where the lateral link 26 is connected to the vehicle body 22. The bushing assembly 110 includes inner and outer tubular members 112 and 114 concentrically disposed in the longitudinal direction of the vehicle. An elastic bushing 116 such as a rubber bushing is filled between the inner and outer tubular members 112 and 114. Referring back to FIG. 3, a bolt 118 extending through the inner tubular member 112 pivotally connects the end portion 28 of the lateral link 26 to the vehicle body 22.

Disposed at the other end 30 of the lateral link 26 is a bushing assembly 120 as best shown in FIG. 6. The bushing assembly 120 includes inner and outer tubular members 122 and 124 having axes M and N both of which extend in the longitudinal direction of the vehicle as best shown in FIG. 3. As seen in FIG. 6, an elastic bushing 126 made of elastomeric material such as rubber is disposed between the inner and outer tubular members 122 and 124. A pair of arcuate reinforcing members 128 are concentrically disposed in the elastic bushing 126 radially opposed with respect to the inner tubular member 122, and in a generally vertical direction as viewed in FIG. 6. Referring back to FIG. 3, a pin 130 extends through the inner tubular member 122 and supported at its one end by a bracket 132 secured to the torsion beam 10. As shown in FIG. 3, the other end of the pin 130 projecting outward from the inner tubular member 122 is fitted with a fastening nut 134.

As shown in FIGS. 3 and 6, the elastic bushing 126 is disposed between the inner and outer tubular members 122 and 124 in a radially opposed relation to define clearances 136 on opposite sides thereof. Thus, the elastic bushing 126 extends substantially vertically and has an increased resiliency in the transverse direction of the vehicle because of the clearances 136 formed in both sides thereof. The increased resiliency allows the axis M of the inner tubular member 122 to be displaced with respect to the axis N of the outer tubular member 124 when a lateral force is applied to the lateral link 26 upon bounding and rebounding of the wheels on a road.

Figure 13:
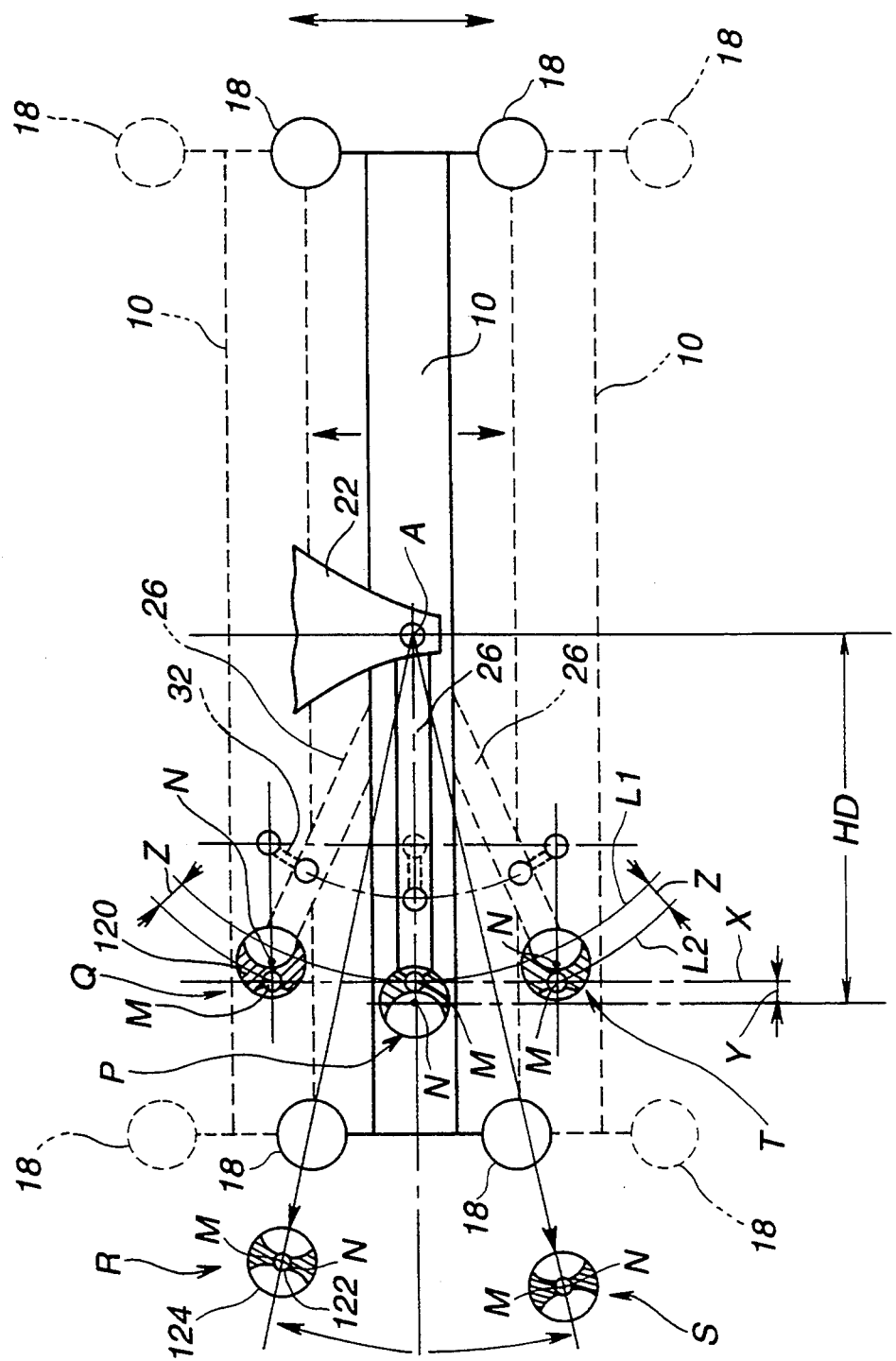
FIG. 13 shows a resilient motion of a bushing assembly disposed at one end portion of the lateral link during bounding and rebounding movements of the vehicle.

Referring to FIG. 18, the relative displacement of the axes M and N of the inner and outer tubular members 122 and 124 of the bushing assembly 120 will now be explained. The lateral link 26 pivotally moves around the axis A during bounding and rebounding motion of the wheels 18 as shown in FIG. 18. Upon this pivotal movement of the lateral link 26, the bushing assembly 120 has a plurality of positions including positions P, Q, R, S and T as shown in FIG. 13. When the bushing assembly 120 shifts into these positions P–T, the axis N pivots around the axis A while keeping spaced apart therefrom at a constant distance. On the other hand, during the shifting of the bushing assembly 120, the axis M coincident with the axis of the pin 180 located at the connection of the lateral link 26 to the torsion beam 10, is displaced horizontally. Simultaneously with the horizontal displacement motion, the axis M moves in the vertical direction as indicated at X in FIG. 18, with respect to the vehicle body.

The bushing assembly 120 is designed to be in the position P as shown in FIG. 13, when the lateral link 26 is placed horizontally with respect to the vehicle body where the lateral link 26 has substantially same level as the torsion beam 10. In this position P, a horizontal distance as indicated at HD in FIG. 13, between the axes N and A is maximum and the axis M is located on a locus L1 and horizontally offset from the axis N toward the axis A by a predetermined distance Y as shown in FIG. 13. When the bushing assembly 120 is in so the positions R and S as seen in FIG. 13, the axis M is coincident with the axis N and the horizontal distance between the axes M and N and the axis A is reduced than that in the position P. When the bushing assembly 120 is in the positions Q and T as seen in FIG. 13, the horizontal distance between the axes N and A is reduced than that in the positions R and S. In the positions Q and T, the axis M is located on a locus L2 as shown in FIG. 13, and horizontally offset from the axis N leftward as viewed in FIG. 13. Namely, in these positions Q and T, a horizontal distance between the axes M and A is larger than that between the axes N and A. The axis M is horizontally displaceable between loci L1 and L2. A distance between the loci L1 and L2 is indicated at Z in FIG. 13. Thus, the axis M is horizontally displaceable with respect to the axis N depending on the variable horizontal distance between the axes N and A during bounding and rebounding motion of the wheels 18.

The aforementioned offset arrangement in which the axis M is displaced from the axis N by the distance Y as seen in FIG. 13, in the position P of the bushing assembly 120, allows the displacement of the axis M within a greater range than the conventional arrangement in which the axes M and N of the inner and outer tubular members are coincident in the position. Accordingly, the bushing assembly having a reduced diameter may be utilized.

Figure 14:
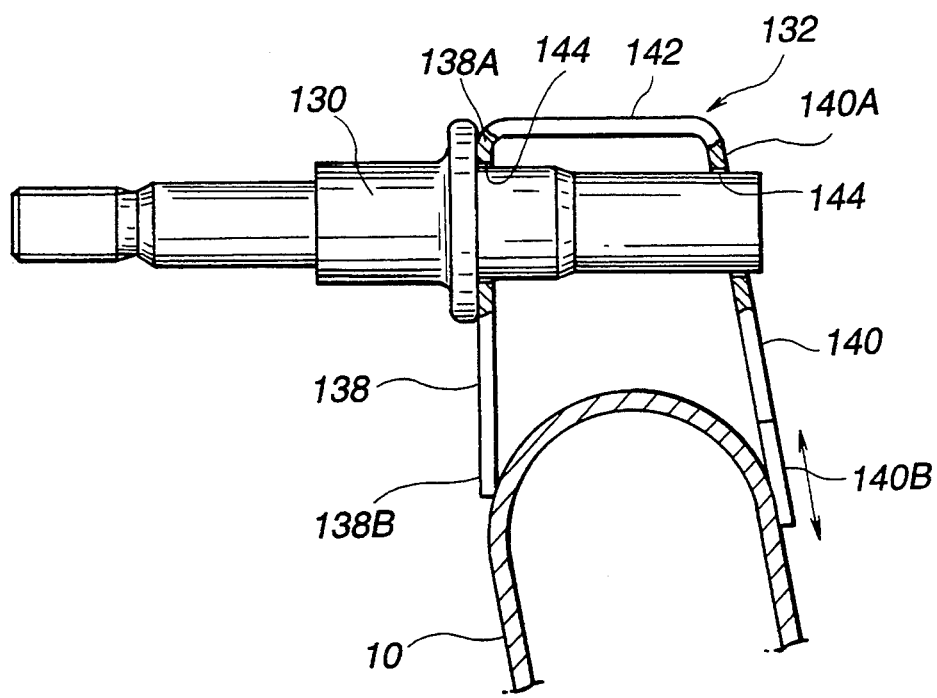
FIG. 14 is a cross-sectional view of a bracket mounted on the torsion beam.

Referring to FIG. 14, the bracket 132 supporting the pin 130 for the lateral link 26, is now described in detail. As shown in FIG. 14, the bracket 132 is of generally reversed U shape and includeslatwo spaced end walls 138 and 140 and a top wall 142 joining the end walls 138 and 140. The end walls 138 and 140 are formed with openings 144 into which the pin 130 is inserted. The end walls 138 and 140 respectively have ends 138A and 140A connected with the top wall 142 and opposite ends 138B and 140B secured to an outer peripheral surface of the torsion beam 10. Upon mounting, at least one of the opposite ends 138B and 140B of the end walls 138 and 140 is slided on the outer peripheral surface of the torsion beam 10 in such direction as indicated by an arrow in FIG. 14, and then secured thereto at its inner face when the bracket 132 is moved to a position where the bracket 132 supports the pin 130 at a predetermined height relative to the torsion beam 10.

Figure 15:
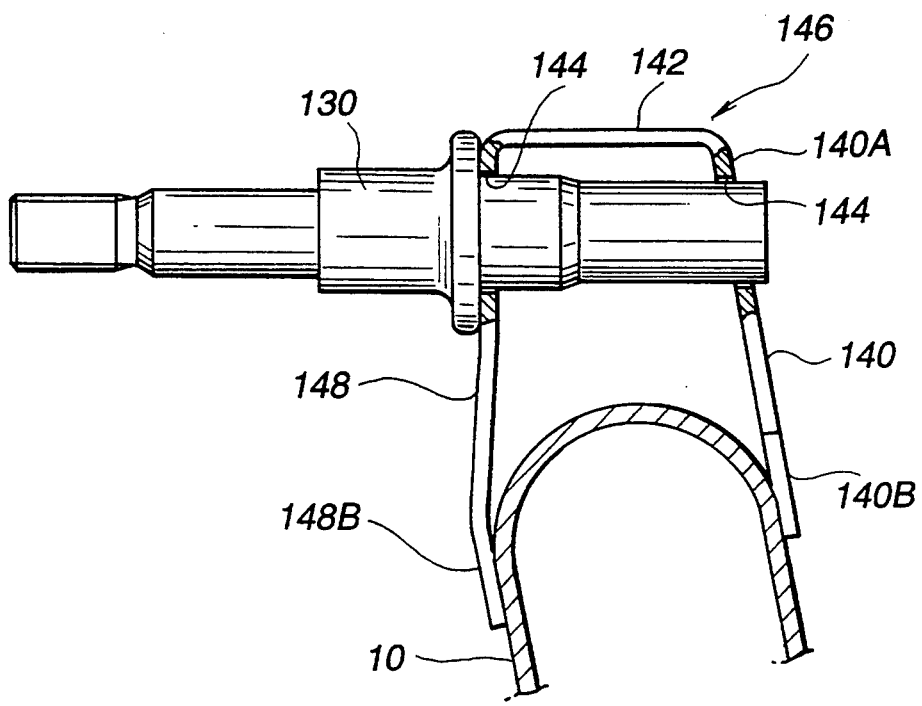
FIG. 15 is a cross-sectional view of a modified bracket mounted on the torsion beam.

FIG. 15 shows a modified bracket 146 which differs from the bracket 132 of the first embodiment in provision of an end wall 148 having an inward bent end 148B which is connected with the torsion beam 10. Like numerals denote like parts of the first embodiment and therefore detailed explanations thereabout are omitted. An inner face of the inward bent end 148B is engaged with the outer peripheral surface of the torsion beam 10 as well as the end 140B of the opposed end wall 140.

Figure 16:
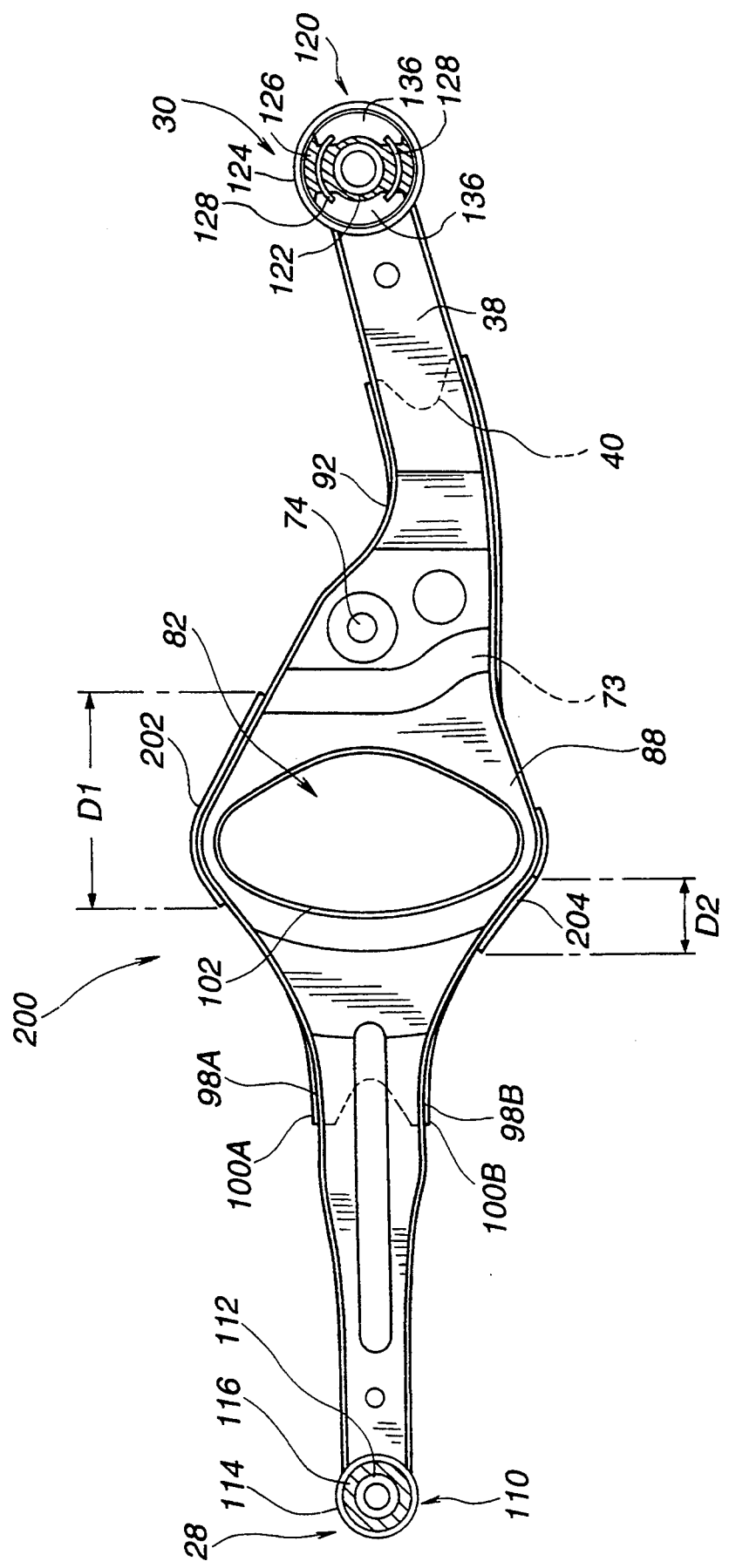
FIG. 16 is an elevation of a modified lateral link.

Referring to FIG. 16, a modified lateral link 200 will now be described. Like numerals denote like parts of the lateral link 26 according to the first embodiment, and therefore detailed explanations thereabout are omitted. The modified lateral link 200 differs from the lateral link 26 in provision of reinforcing plates 202 and 204 which have increased size, respectively. As shown in FIG. 16, the reinforcing plate 202 is disposed at the opposed upper ends of the main and subsidiary plates 38 and 40 and extends over zone D1 in the swelled areas 88 to cover the whole length of the oval openings 82 and 84 in the longitudinal direction of the lateral link 26. The reinforcing plate 204 is disposed at the opposed lower ends as viewed in FIG. 16, of the main and subsidiary plates 38 and 40 and extends over zone D2 in the swelled areas 88 to overlap partially the reinforcing plate 202 as best shown in FIG. 17. The provision of the reinforcing plates 202 and 204 serves for ensuring disturbance of entry of foreign substances into the space between the main and subsidiary plates 38 and 40 from the upperside and lowerside as viewed in FIG. 16.

Figure 19:
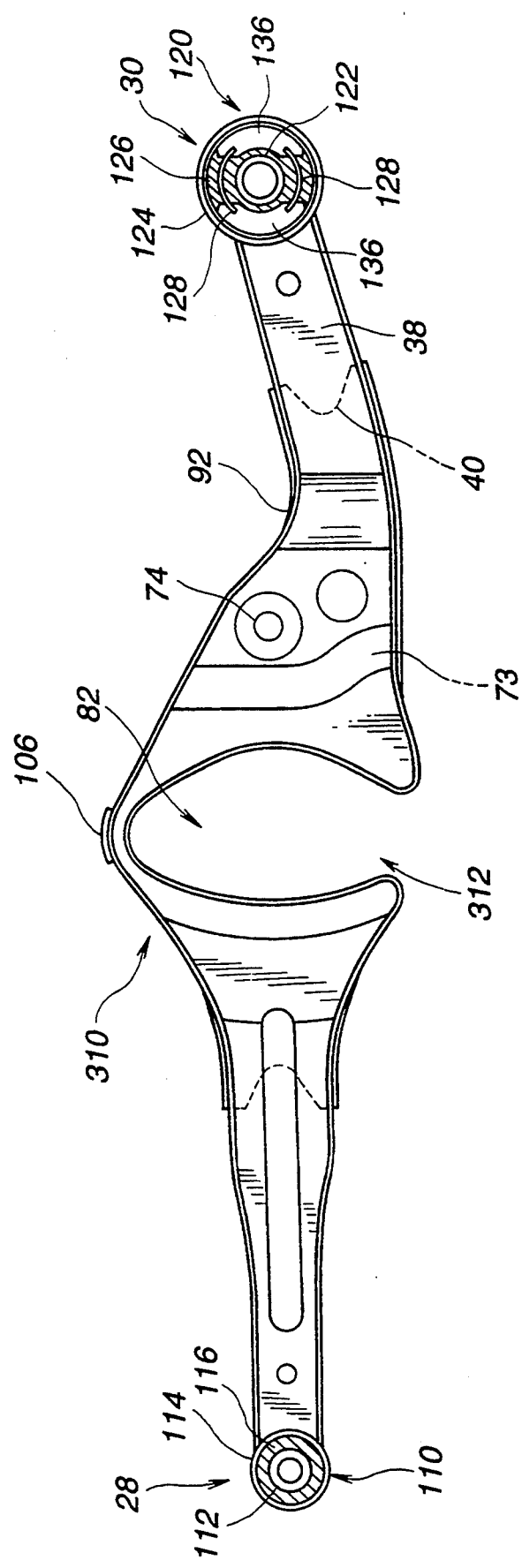
FIG. 19 is an elevation of still another modified lateral link.

FIGS. 18 and 19 show other modified lateral links 300 and 310 which differ from the lateral link 26 of the first embodiment in provision of cut outs 302 and 312. Like numerals indicate like parts of the lateral link 26. As shown in FIGS. 18 and 19, the cut outs 302 and 312 are so disposed at the opposed upper and lower ends of the main and subsidiary plates 38 and 40, respectively, as to communicate with the openings 82 and 84 but keep rigidity of the lateral links 300 and 310.

What is claimed is:

1. In an automotive vehicle:
    a vehicle body;
    a torsion beam supporting left and right axles at opposite ends thereof and supporting said vehicle body thereon;
    a lateral link extending in a transverse direction of said vehicle body and pivotally connected at one end portion thereof to said vehicle body about a first axis and at the other end portion thereof to said torsion beam about a second axis parallel to said first axis;
a control link pivotally connected at one end portion thereof to said lateral link about a third axis and at the other end portion thereof to said torsion beam about a fourth axis parallel to said third axis;
wherein centers of the respective pivotal connections of said lateral link to said vehicle body and said torsion beam and centers of the respective pivotal connections of said control link to said lateral link and said torsion beam, are disposed in a common vertical plane with respect to said vehicle body;
wherein said lateral link includes means for sharing a lateral force applied to said lateral link;
wherein said sharing means include a set of plates opposed in a longitudinal direction of the vehicle to define a space in which said control link is disposed;
wherein said set of plates are respectively formed with shoulders on which said one end portion of said control link is supported; and
a pin fixedly supported by said shoulders of said set of plates of said lateral link.

2. An automotive vehicle, comprising:
a vehicle body;
a torsion beam supporting left and right axles at opposite ends thereof and supporting said vehicle body thereon;
a lateral link extending in a transverse direction of said vehicle body and pivotally connected at one end portion thereof to said vehicle body about a first axis and at the other end portion to said torsion beam about a second axis parallel to said first axis, said lateral link including a set of members for sharing a force applied to said lateral link, said set of members being opposed in a longitudinal direction of the vehicle to define a space in which a control link is disposed;
a control link pivotally connected at one end portion thereof to said lateral link about a third axis and at the other end portion thereof to said torsion beam about a fourth axis parallel to said third axis; and
a pin supported between said set of members of said lateral link to connect pivotally said control link to said lateral link;
wherein centers of the respective pivotal connections of said lateral link to said vehicle body and said torsion beam and centers of the respective pivotal connections of said control link to said lateral link and said torsion beam are disposed in a common vertical plane with respect to said vehicle body.

3. An automotive vehicle as claimed in claim 2, wherein said set of members are respectively formed with shoulders on which said one end portion of said control link is supported.

4. An automotive vehicle as claimed in claim 3, wherein said space between said set of members is reduced in the longitudinal direction of the vehicle.

5. An automotive vehicle as claimed in claim 2, further comprising a second pin fixed on said torsion beam to connect pivotally said other end portion of said control link to said torsion beam.

6. An automotive vehicle as claimed in claim 5, wherein said second pin extends into said space between said set of members through an opening formed on one of said set of members which is opposed to said torsion beam.

7. An automotive vehicle as claimed in claim 6, wherein said opening is so arranged as to have a predetermined size to prevent interference between said lateral link and said second pin for said other end portion of said control link upon the relative pivotal motion of said lateral link and said control link.

8. An automotive vehicle as claimed in claim 6, wherein said one of said set of members is formed with an integral flange surrounding said opening.

9. An automotive vehicle as claimed in claim 2, wherein said set of members are formed with integral flanges on peripheral edges, respectively.

10. An automotive vehicle as claimed in claim 2, further comprising a reinforcing member which connects said set of members of said lateral link.

11. An automotive vehicle as claimed in claim 2, wherein said pivotal connection of said lateral link to said torsion beam is disposed at a predetermined height relative to said torsion beam.

12. An automotive vehicle as claimed in claim 11, further comprising a second pin having an axis aligned with said second axis wherein said second pin is fixedly supported by a bracket which is secured to said torsion beam.

13. An automotive vehicle as claimed in claim 12, wherein said bracket is of a generally reversed U shape and includes a pair of opposed wall portions, at least one of said wall portions being slidable on said torsion beam for adjustment of said predetermined height of said pivotal connection of said lateral link to said torsion beam before securement.

14. An automotive vehicle as claimed in claim 2, further comprising a bushing assembly disposed on said connection of said lateral link to said torsion beam, said bushing assembly including inner and outer tubular members having axes extending in the longitudinal direction of the vehicle, and an elastic bushing disposed between said inner and outer tubular members, said elastic bushing having an increased resiliency in the transverse direction of the vehicle, said axis of said inner tubular member being horizontally displaceable relative to said axis of said outer tubular member depending on a variable horizontal distance between said first axis and said axis of said inner tubular member, said axis of said inner tubular member being so horizontally displaced as to be offset from said axis of said outer tubular member toward said first axis by a predetermined distance when said horizontal distance between said first axis and said axis of said outer tubular member is maximum.

15. An automotive vehicle as claimed in claim 14, wherein said outer tubular member is connected to said lateral link and said inner tubular member is connected to said torsion beam.

16. An automotive vehicle as claimed in claim 2, wherein said lateral link has a recessed portion arranged to prevent interference between said lateral link and components disposed in the vicinity of said lateral link.

17. An automotive vehicle as claimed in claim 16, wherein said recessed portion is disposed between the pivotal connection of said lateral link to said torsion beam and the pivotal connection of said control link to said lateral link.

* * * * *